(12) United States Patent
Long et al.

(10) Patent No.: US 7,880,739 B2
(45) Date of Patent: Feb. 1, 2011

(54) VIRTUAL WINDOW WITH SIMULATED PARALLAX AND FIELD OF VIEW CHANGE

(75) Inventors: David C Long, Wappingers Falls, NY (US); Jason S Miller, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 11/548,300

(22) Filed: Oct. 11, 2006

(65) Prior Publication Data

US 2008/0088624 A1    Apr. 17, 2008

(51) Int. Cl.
*G06T 15/20*    (2006.01)
(52) U.S. Cl. ............................ 345/427; 345/7; 345/419; 382/103; 382/117; 348/14.08; 348/143
(58) Field of Classification Search .................. 345/7, 345/419, 427; 382/103, 117; 348/143, 14.08
See application file for complete search history.

(56) References Cited

U.S. PATENT DOCUMENTS

| | | | |
|---|---|---|---|
| 5,495,576 A | 2/1996 | Ritchey | |
| 5,991,073 A | 11/1999 | Woodgate | |
| 6,152,563 A * | 11/2000 | Hutchinson et al. | 351/209 |
| 6,778,150 B1 * | 8/2004 | Maguire, Jr. | 345/7 |
| 6,803,912 B1 | 10/2004 | Mark et al. | |
| 7,126,603 B2 * | 10/2006 | Aliaga et al. | 345/427 |
| 2004/0240709 A1 * | 12/2004 | Shoemaker | 382/103 |
| 2005/0047629 A1 * | 3/2005 | Farrell et al. | 382/117 |
| 2005/0059488 A1 * | 3/2005 | Larsen et al. | 463/36 |
| 2005/0062678 A1 | 3/2005 | Mark et al. | |
| 2005/0280706 A1 * | 12/2005 | Jong | 348/143 |
| 2007/0263080 A1 * | 11/2007 | Harrell et al. | 348/14.08 |

OTHER PUBLICATIONS

Hoagland. The Virtual Window Project. Sep. 21, 2004. http://www.hoagy.org/virtualwindow/.*
Gaver et al. A Virtual Window on Media Space. Proceedings of the SIGCHI Conference on Human Factors in Computing Systems. ACM Press/Addison-Wesley Publishing Co. 1995.*
Chen, Shenchang Eric. QuickTime VR—An Image-Based Approach to Virtual Environment Navigation. ACM. 1995.*

(Continued)

*Primary Examiner*—Kimbinh T Nguyen
(74) *Attorney, Agent, or Firm*—DeLio & Peterson, LLC; Peter W. Peterson

(57) ABSTRACT

A system and method for simulating to one or more individual observers a view through a window using a display screen comprising a storage device containing in electronic form one or more images of a scene selected from the group consisting of one or more images of the scene at different angles and one or more images of the scene at different magnifications. A display screen is adapted to display the images to one or more individual observers, and a sensor is adapted to locate observers with respect to the display screen. A controller is adapted to select one or more of the images based on angle or distance of the individual observers with respect to the display screen and display the selected images on the display screen to simulate to the observers a view through a window of the scene.

22 Claims, 9 Drawing Sheets

OTHER PUBLICATIONS

Rekimoto, Jun. A Vision-Based Head Tracker for Fish Trank Virtual Reality. Proceedings of the Virtual Reality Annual International Symposium. 1995.*

Radikovic et al. Artificial Window Video of Nature. Conference on Human Factors in Computing Systems. 2005.*

Ji et al. Eye and Gaze Tracking for Interactive Graphic Display. Machine Vision and Applications. vol. 15. Issue 3. Jul. 2004.*

Ijsselsteijn et al. Looking At or Looking Out—Exploring Monocular Cues to Create a See-Through Experience with a Virtual Window. 2006.*

Friedman et al. Office Window of the Future? Two Case Studies of an Augmented Window. Conference on Human Factors in Computing Systems. 2004.*

Lei et al. Real-Time Multi-Step View Reconstruction for a Virtual Teleconference System. EURASIP Journal on Applied Signal Processing. vol. 2002. Issue 1. 2002.*

Gayer et al. One is Not Enough: Multiple Views in a Media Space. Proceedings of the Interact '93 and CHI '93 Conference on Human Factors in Computing Systems. 1993.*

* cited by examiner

VIRTUAL WINDOW WITH SIMULATED PARALLAX AND FIELD OF VIEW CHANGE

BACKGROUND OF THE INVENTION

1. Field of the Invention

The present invention relates to virtual imaging and, in particular, to a method and system for simulating to one or more individual observers a view through a window using a display screen.

2. Description of Related Art

The rapid increase in quality and reduction in cost of flat-screen display technologies over the past several years have opened up many new novel applications for flat-panel displays. One such application is the use of flat-panel displays as virtual windows. This has been described as a flat-panel display built within what appears to be a conventional window frame, with the flat-panel display showing desired scenes. This technique provides a static image through which one can create a virtual view from a high resolution digital image of a real-world scene. When built with high resolution display panels, such an image can be quite convincing to the stationary observer. However, as soon as the observer moves, the window loses its appearance of reality due to lack of parallax shift and field of view changes that would be observable when looking out a real window.

SUMMARY OF THE INVENTION

Bearing in mind the problems and deficiencies of the prior art, it is therefore an object of the present invention to provide an improved method and system for simulating to one or more individual observers a view through a window using a display screen.

It is another object of the present invention to provide a virtual window that employs parallax shift and field of view changes that would be observable when looking out a real window.

A further object of the invention is to provide a method and system that makes parallax shift and field of view changes to a virtual scene based on position of one or more individual observers.

Still other objects and advantages of the invention will in part be obvious and will in part be apparent from the specification.

The above and other objects, which will be apparent to those skilled in the art, are achieved in the present invention which is directed in one aspect to a method of simulating to one or more individual observers a view through a window using a display screen comprising providing one or more images of a scene selected from the group consisting of images of the scene at one or more different angles and images of the scene at one or more different magnifications, and providing a display screen for displaying the one or more images to one or more individual observers. The method then includes determining location of one or more individual observers with respect to the display screen, selecting one or more of the images based on angle or distance of the one or more individual observers with respect to the display screen; and displaying the selected one or more images on the display screen to simulate to the one or more individual observers a view through a window of the scene.

The method may further include changing the displayed image on the display screen based on changing location of one or more individual observers with respect to the display screen. The location of the one or more individual observers with respect to the display screen may comprise distance of the one or more individual observers from the display screen, and the one or more images selected may be based on the distance of the one or more individual observers from the display screen. The location of the one or more individual observers with respect to the display screen may alternatively or additionally comprise angle of the one or more individual observers with respect to the display screen, and the one or more images selected may be based on the angle of the one or more individual observers with respect to the display screen.

The one or more images of the scene may be provided by a camera at a scene location, and the method may include capturing a plurality of images of the scene while the camera rotates over a desired angle through a desired plane. The method may further include storing the one or more images of the scene in a storage device associated with the display screen.

The one or more images displayed on the display screen may be still images, and the display screen may sequentially display still images that differ in angle of view and magnification of the scene based on changes in location of the one or more individual observers with respect to the display screen. The image of the scene may be digitally magnified based on distance of the one or more individual observers from the display screen.

The location of one or more individual observers with respect to the display screen may be determined using a sensor device selected from the group consisting of ultrasonic, infrared or radar sensors, cameras, and pressure sensors.

Preferably, the display screen is planar, and the location of the one or more individual observers with respect to the display screen is based on distance of the one or more individual observers from a center of the display screen, and by angle of a line extending between the center of the display screen and the one or more individual observers.

The one or more images of the scene may be provided in real time by a camera at a scene location, and the method may include moving the camera in response to location of the one or more individual observers with respect to the display screen to simulate to the one or more observers a real time view through a window of the real time scene.

In another aspect, the present invention is directed to a system for simulating to one or more individual observers a view through a window using a display screen comprising a storage device containing in electronic form one or more images of a scene selected from the group consisting of one or more images of the scene at different angles and one or more images of the scene at different magnifications. The system also includes a display screen adapted to display the one or more images to one or more individual observers, and a sensor adapted to locate one or more individual observers with respect to the display screen. The system further has a controller adapted to select one or more of the images based on angle or distance of the one or more individual observers with respect to the display screen and display the selected one or more images on the display screen to simulate to the one or more individual observers a view through a window of the scene.

The controller may be adapted to change the displayed image on the display screen based on changing location of one or more individual observers with respect to the display screen. The controller may be adapted to digitally magnify the image of the scene based on distance of the one or more individual observers from the display screen.

The sensor may be adapted to locate the one or more individual observers with respect to the display screen based on distance of the one or more individual observers from the display screen, and the controller may be adapted to select the one or more images based on the distance of the one or more individual observers from the display screen. Additionally or alternatively, the sensor may be adapted to locate the one or more individual observers with respect to the display screen based on angle of the one or more individual observers with respect to the display screen, and the controller may be adapted to select the one or more images selected based on the angle of the one or more individual observers with respect to the display screen.

The system may further include a camera at a scene location adapted to capture a plurality of images of the scene while the camera rotates over a desired angle through a desired plane. The camera may be adapted to store the images of the scene in a storage device associated with the display screen.

The location sensor is preferably selected from the group consisting of ultrasonic, infrared and radar sensors, cameras, and pressure sensors.

Preferably, the display screen is planar, and the location sensor is adapted to determine location of the one or more individual observers with respect to the display screen based on distance of the one or more individual observers from a center of the display screen, and by angle of a line extending between the center of the display screen and the one or more individual observers.

The system may further include a camera at a scene location adapted to provide one or more images of the scene in real time, and the controller may be adapted to move the camera in response to location of the one or more individual observers with respect to the display screen to simulate to the one or more observers a real time view through a window of the real time scene.

In yet another aspect, the present invention is directed to a computer program product for use with a display device for simulating to one or more individual observers a view through a window, said computer program product comprising a computer usable medium having computer readable program code means embodied in said medium for providing one or more images of a scene selected from the group consisting of one or more images of the scene at different angles and one or more images of the scene at different magnifications; computer readable program code means for determining location of one or more individual observers with respect to the display device; computer readable program code means for selecting one or more of the images based on angle or distance of the one or more individual observers with respect to the display device; and computer readable program code means for displaying the selected one or more images on the display device to simulate to the one or more individual observers a view through a window of the scene.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1-9 of the drawings in which like numerals refer to like features of the invention.

Figure 1:
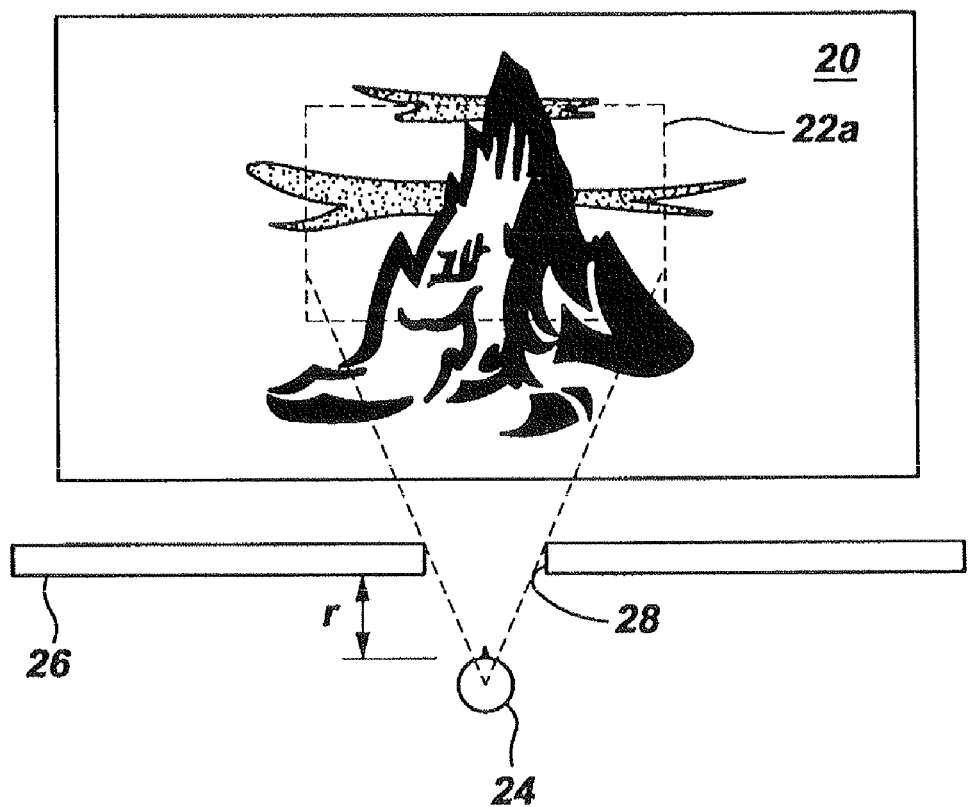
FIG. 1 is a top plan view of an individual observer viewing an elevational real-world scene through a window, showing the portion of the scene that would be viewed from a central position in front of the window.
Figure 2:
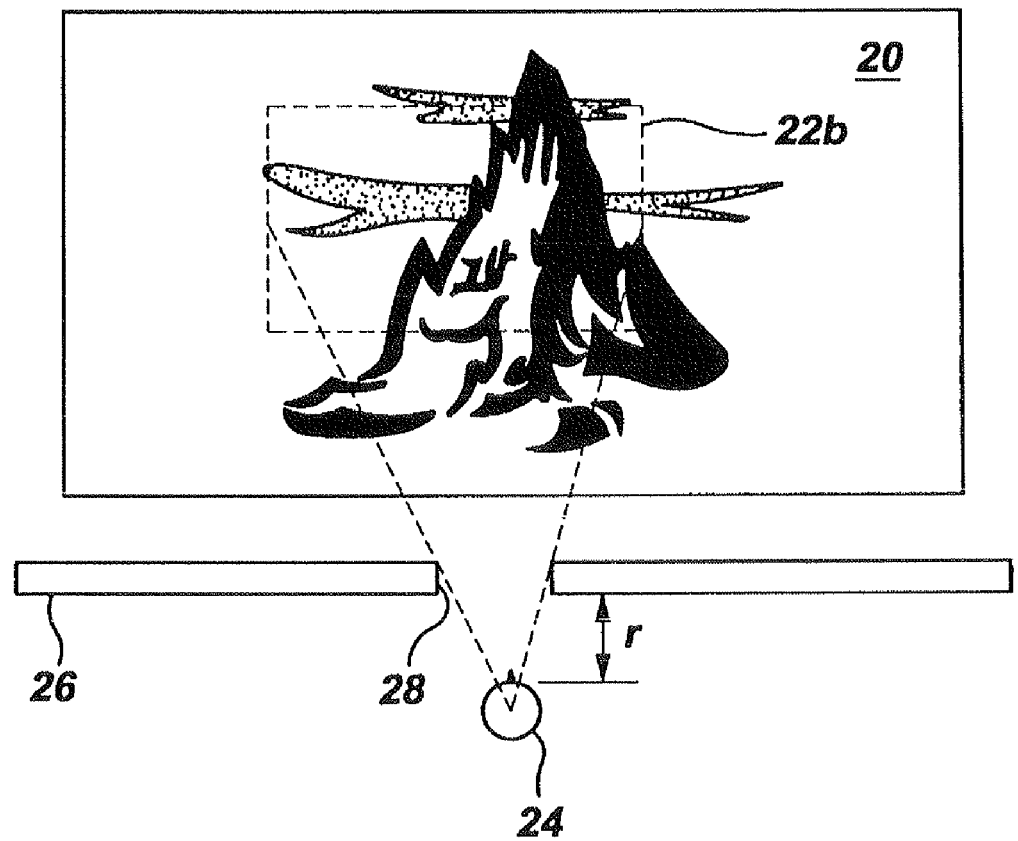
FIG. 2 is a top plan view of an observer viewing the real-world scene of FIG. 1, showing the portion of the scene that would be viewed from a position in front of the window shifted to the right.
Figure 3:
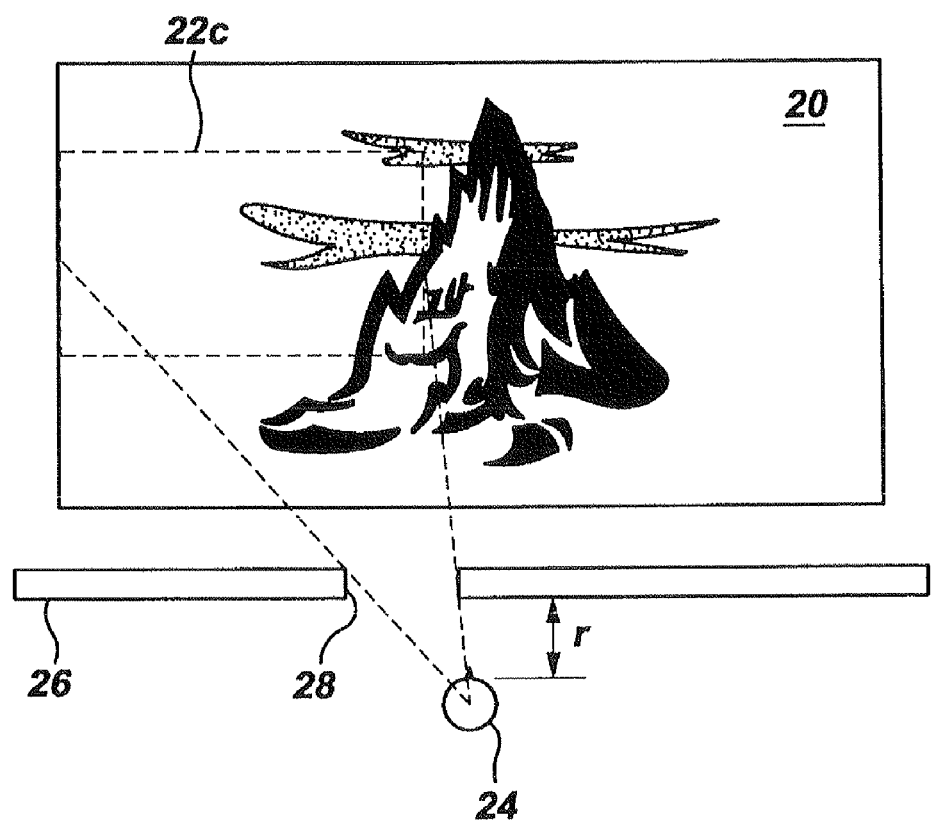
FIG. 3 is a top plan view of an observer viewing the real-world scene of FIG. 1, showing the portion of the scene that would be viewed from a position in front of the window shifted further to the right than FIG. 2.

The present invention improves upon the prior art by disclosing a method for adding view changes due to parallax shift and field of view changes to virtual windows made using flat panel displays, thereby greatly enhancing the illusion of looking through a real window. Such view changes due to parallax shift and field of view changes are illustrated in FIGS. 1-6. As shown in FIG. 1, a real-world landscape scene 20 exists outside of a wall 26 having a window opening 28. An individual observer or viewer 24 standing a distance r from and directly in front of window 28 would view the portion of the landscape 20 bounded by box 22a. As shown in FIG. 2, once the viewer 24 shifts to the right with respect to window 28, even while standing the same distance r therefrom, the viewed scene would shift to that shown in box 22b, where the mountain is shifted to the right in box 22b compared to its position in box 22a. Moving even further to the right, while still at distance r from the wall as shown in FIG. 3, the viewer 24 sees a still different portion of landscape 20, as shown in the box 22c. The difference between scenes 22a, 22b and 22c shown in FIGS. 1-3 is known as parallax shift.

Figure 4:
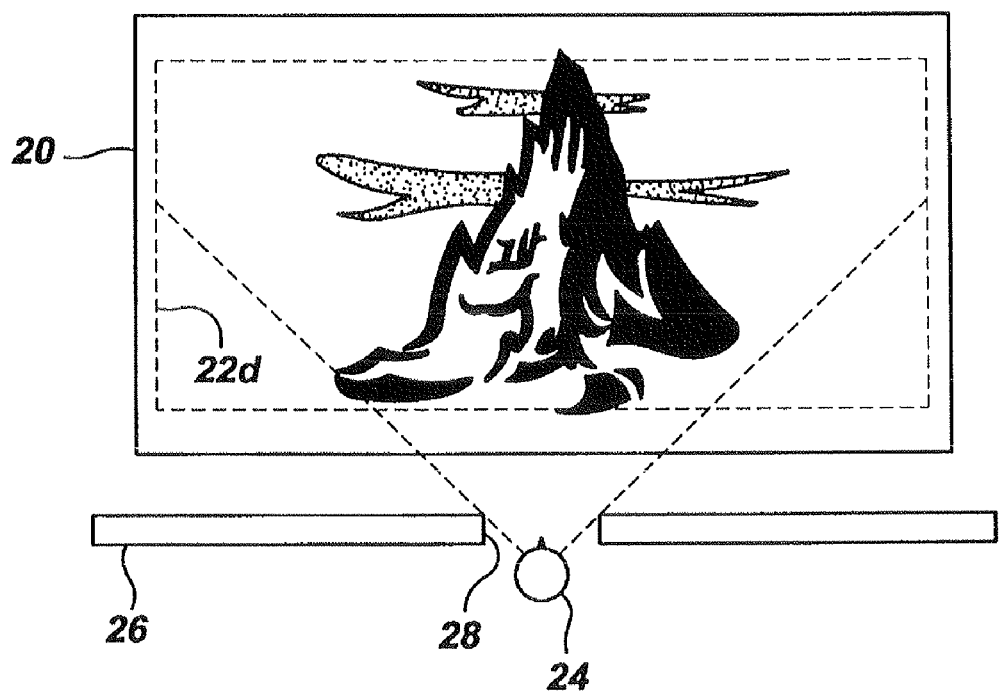
FIG. 4 is a top plan view of an observer viewing the real-world scene of FIG. 1, showing the portion of the scene that would be viewed from a close-up central position.
Figure 5:
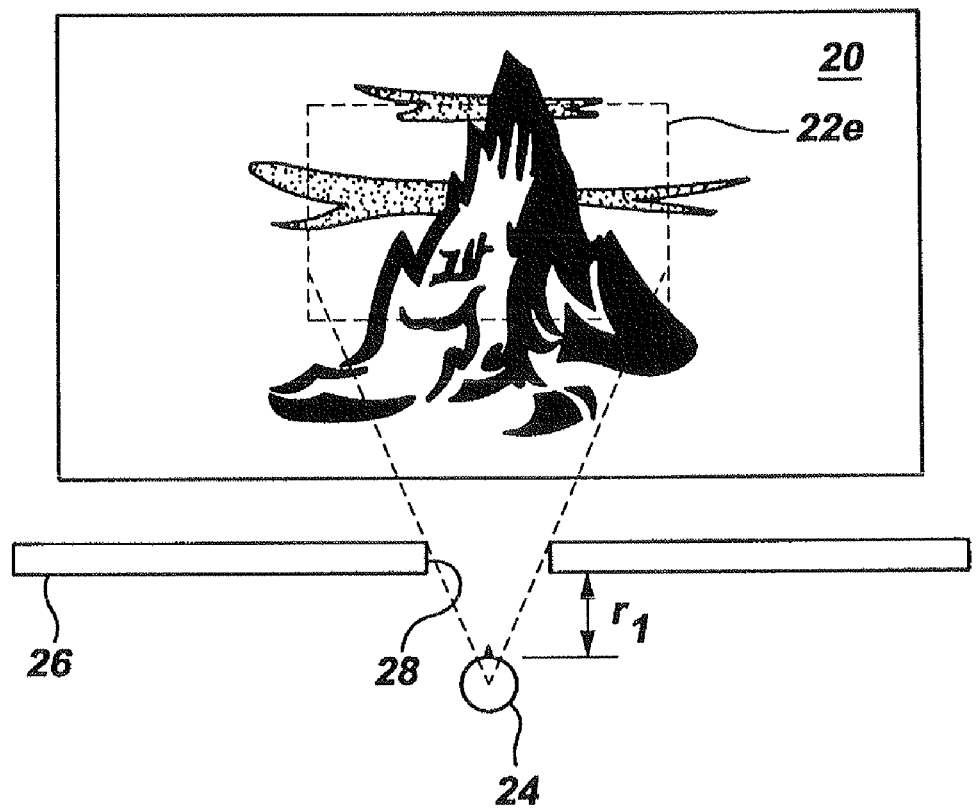
FIG. 5 is a top plan view of an observer viewing the real-world scene of FIG. 1, showing the portion of the scene that would be viewed from a central position farther away from the window than in FIG. 4.
Figure 6:
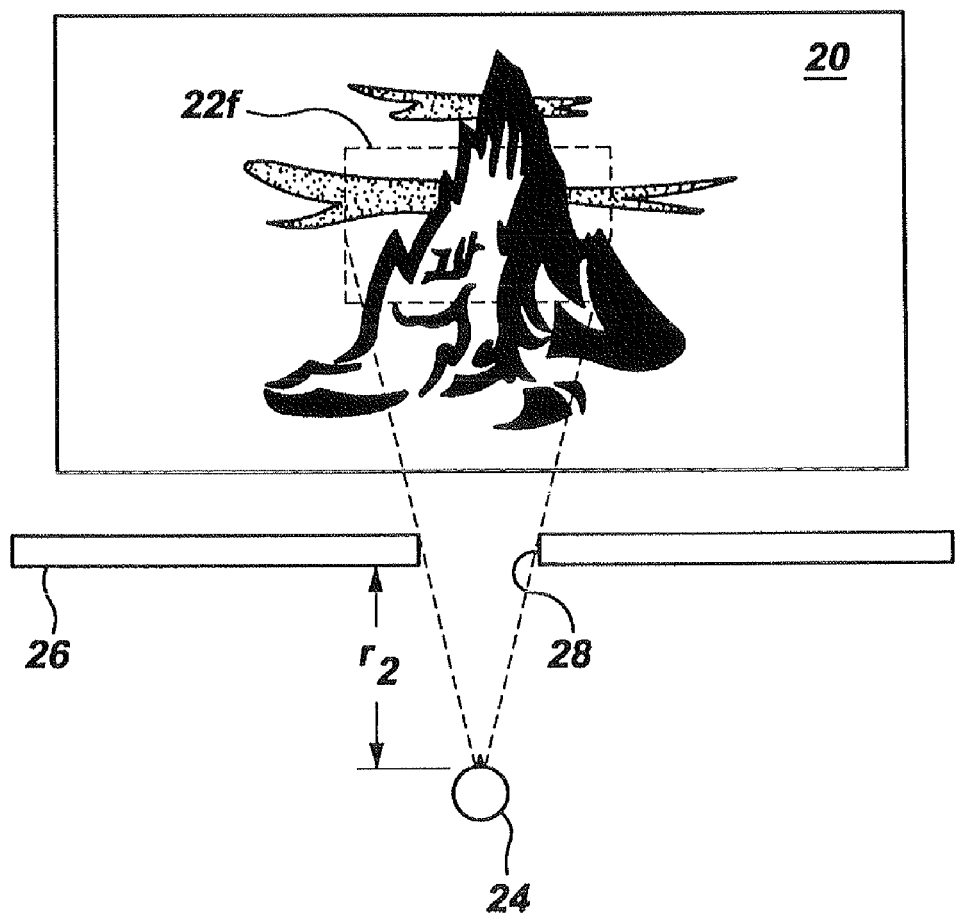
FIG. 6 is a top plan view of an observer viewing the real-world scene of FIG. 1, showing the portion of the scene that would be viewed from a central position farther away from the window than in FIG. 5.

Field of view changes are shown in FIGS. 4-6. As shown in FIG. 4, a viewer 24 standing a distance r=0 from wall 26 would see the portion of landscape 20 bounded by box 22d. When the viewer moves away from wall 26 to a distance $r_1$ (FIG. 5), the portion of the landscape 20 that he would see is illustrated by box 22e, where a smaller portion of the scene is viewed through the window opening than that from the viewer's position in FIG. 4. Moving a further distance $r_2$ from wall 26 (FIG. 6), the viewer sees a smaller portion of the landscape scene 20 as shown by box 22f.

Figure 7:
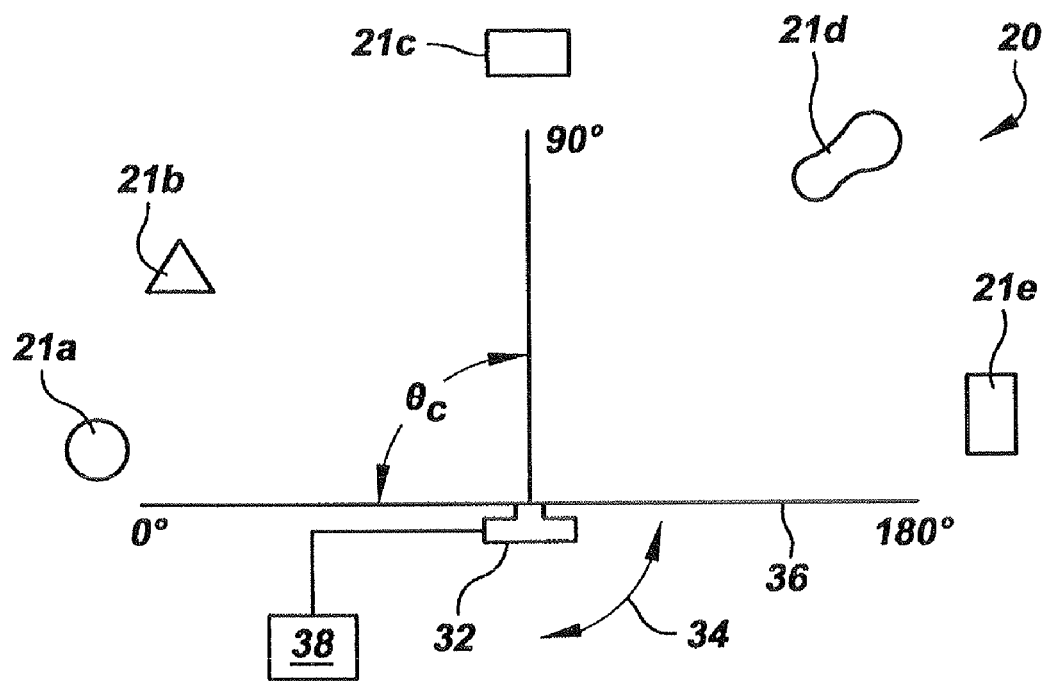
FIG. 7 is a top plan view of an apparatus use to obtain images of a desired scene over a variety of angles, in accordance with the present invention.

In order to acquire images for a virtual window to be constructed in accordance with the present invention, one would first take pictures of the desired scene with a camera over a variety of angles. The camera 32 employed may be any digital still or video camera capable of acquiring electronic digital images at the desired resolution for use with a desired flat-panel display device. As shown in FIG. 7, camera 32 may be set on a rotating mechanism such as a rotating head on a tripod so that it is able to rotate in a horizontal plane as shown by arrow 34. Preferably, the rotating head includes a stepper motor mechanism to place the camera in a stationary position at a plurality of different desired angles. The camera is used then to take pictures at the different angles of scene 20, which here is shown as comprising numerous objects 21a, 21b, 21c, 21d and 21e within the scene. The camera is located in plane 36, which in the present invention corresponds to the location of the virtual window for the viewer. As shown in FIG. 7, the angle of view $\theta_c$ of the camera 32 is shown as $\theta_c=90°$, where $\theta_c$ is measured with respect to the plane of the camera lens when it is pointed straight at the scene 20. To acquire images of the real-world scene 20, camera 32 is rotated between $\theta_c=0°$ and $\theta_c=180°$, and stopped at discrete angles to take different pictures of the various object 21a through 21e in scene 20. For example, one may desire to take 1000 pictures, each at a different angle of 0.180° from the next. Each of the pictures is stored in electronic form in a digital memory or other storage device 38, along with an identification of the scene and an identification of the distance d and angle $\theta_c$ view of the camera with respect to the real-world scene.

Alternately, one picture may be taken with a wide-angle lens, and the portion of the picture displayed adjusted accordingly to match the viewer's position. While this technique is not as accurate as the above mentioned technique, it would be a simpler, faster, and less expensive way of acquiring the image. This technique would enable field of view shifting, but not the true parallax shift provided by the multi-image acquisition technique. This single-image technique would be useful in cases where the objects being viewed are far away from the viewer. Additionally, this technique would enable the use of pre-existing images, such as those of natural landscapes, landmarks, and the like.

Figure 8:
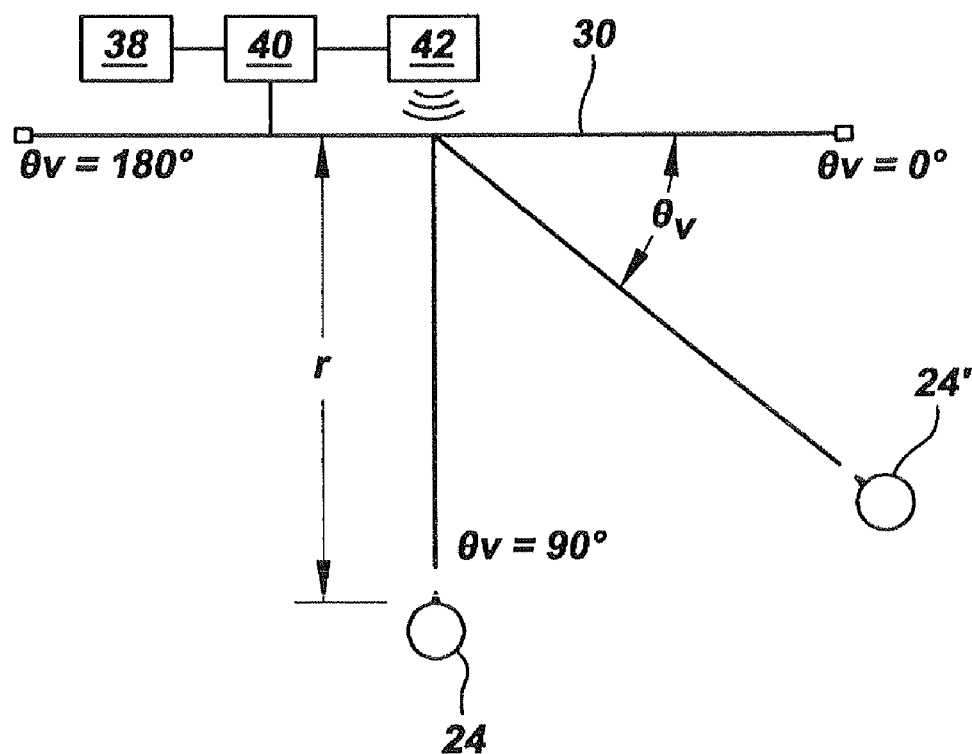
FIG. 8 is a top plan view of the relative position of an observer viewing a virtual image of a real-world scene, showing the detected angular position and distance of the observer with respect to the flat panel display.

A flat-paneled display device 30 is shown in FIG. 8, along with the initial position of a viewer 24 at a distance r and at an angle $\theta_v=90°$ from the plane of the flat-panel display. In order to select the image needed from the memory storage device 38 to provide a realistic virtual view on display panel 30, a sensor 42 is required to determine the location of the viewer with respect to the virtual window, i.e., the distance r and angle $\theta_v$ of the viewer with respect to the center of the screen of the flat-panel display 30. Sensors that may be used include ultrasonic, infrared or radar sensors, or video or still cameras, including web cams, CCD digital video cameras, and those that use infrared illumination for night vision. Potential sensing means also include pressure sensors in the floor or other means known in the art to provide the relative location of viewer 24 with respect to flat-panel display 30. Once the values of r and $\theta_v$ are known from sensor 42, the data is sent to and employed by microprocessor controller 40 to select the proper image from storage 38 to be displayed on the flat-panel display 30, so that viewer 24 see the proper image thereon. Assuming that the distance r of viewer 24 from the center of display panel 30 conforms to that of the distance r at which the stored pictures were taken, all that is necessary is for the picture displayed on flat-panel 30 to conform to the angle $\theta_v$ of the viewer with respect to the plane of the flat-panel display 30. For example, if a viewer were in position 24' as shown in FIG. 8, with a $\theta_v$ of, for example, 45° with respect to the plane of the display 30 screen (along the right side of the center of the display), then the digitally stored picture taken at the angle $\theta_c=45°$ in FIG. 7 (pointed toward the opposite, left side of the real-world scene) is displayed on flat-panel display 30. If the viewer only changes angle while keeping a constant distance r from the center of flat-panel display 30, all that would change on the display would be the picture angle $\theta_c$ which would then conform to the viewer angle $\theta_v$.

Figure 9:
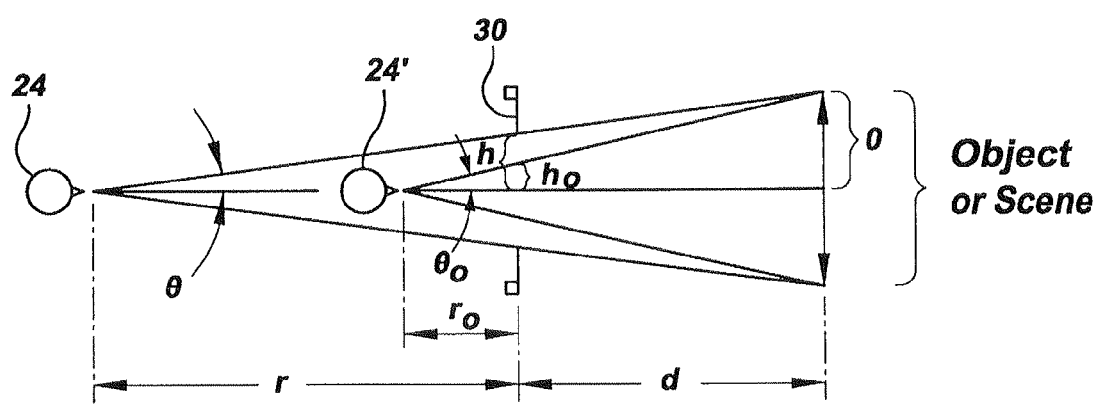
FIG. 9 is a top plan view of the relative position of an observer viewing a virtual image of a real-world scene on a flat panel display, showing the magnification parameters required for the distance of the observer with respect to the display.

If the distance of viewer r changes to one that does not conform to the distance r at which the original picture was acquired, then the magnification of the displayed image on flat-panel display 30 must be adjusted. As shown in FIG. 9, the magnification required for the virtual window picture display (MAG) may be determined from the relationships shown therein and below between the virtual window 30 to be simulated and the distant and close positions of the individual observer or viewer, 24 and 24', respectively.

O=½ object width
d=object distance from "window" 30
r=viewer distance from "window" 30
$r_o$=Viewer distance from "window" up closer
h=½ object width in "window" with viewer at r
$h_o$=½ object width in "window" with viewer at $r_o$
$\theta$=½ angle of object at viewer's eyes at r $\theta_o$=½ angle of object at viewer's eyes at $r_o$
MAG=increase in apparent image size as viewer moves back away from window from $r_o$ to r Using these defined terms, the following relationships apply:

$$\tan\theta_o = \frac{o}{r_o+d} \quad \tan\theta = \frac{o}{r+d}$$

$$\tan\theta_o = \frac{ho}{ro} \quad \tan\theta = \frac{h}{r}$$

$$h = r\tan\theta$$

$$h_o = r_o\tan\theta$$

$$h = \frac{ro}{r+d} \quad h_o = \frac{r_o o}{r_o+d}$$

$$MAG = \frac{h}{ho} = \text{MAGNIFICATION}$$

$$MAG = \frac{r/(r_o+d)}{r_o/(r+d)}$$

for $d \gg r$, $r+d = d$:

$$MAG = \frac{rd}{r_o d} = \frac{r}{r_o}$$

Thus, the magnification of the displayed image on flat-panel display 30 may be adjusted based on the change in distance of the individual observer or viewer from the display. For example for a typical virtual window that is 20 in. wide, a close viewing distance $r_0$ would equal 1 ft. and a typical far viewing distance r would equal 20 ft. If the object shown in the virtual window is significantly farther away than the far viewing distance, for example 100 ft., the apparent magnification h/$h_0$ in image size for the viewer moving from 1 ft. distance back to 10 ft. distance is determined as:

$MAG=r/r_0=10/1=10$

This may be verified experimentally by looking out a window at a distant object and then backing up from the window and noting the apparent relative increase in the object size with respect to the size of the window. Each digital image of the real-world scene that is stored in the memory storage device 38 may be stored at a single magnification, and any change in magnification may be determined by microprocessor 40 based on the location of the individual observer or viewer, and applied to the stored image after retrieval from memory 38 and prior to display on device screen 30. Alternatively, each image may be stored in memory storage device 38 at a plurality of magnifications, and microprocessor 40 would then select the desired magnification of the image from memory 38 after determining the magnification needed.

The method of the present invention for simulating to one or more individual observers a view through a window using a display screen may be implemented by a computer program or software incorporating the process steps and instructions described above in otherwise conventional program code and stored on an otherwise conventional program storage device. As shown in FIG. 8, the program code, as well as any input information required, may be stored in a computer on storage device 38, such as a semiconductor chip, a read-only memory, magnetic media such as a diskette or computer hard drive, or optical media such as a CD or DVD ROM. The computer system has a microprocessor 42 for reading and executing the stored program on device 38.

The virtual window flat-panel or video projection display system of the present invention may be employed in residences with poor or no views, in hospital rooms, in windowless workplaces, and the like. In such applications, the scene viewed may be any desired scene that is pleasing to the viewer.

Additionally, the virtual window of the present invention may be used to display real-world, real time scenes, including live video. In such case, the camera acquiring the images would move through angle $\theta_c$ at the same time the viewer moves though angle $\theta_v$, in response to commands from the microprocessor controller 40 based on location of the individual observer 24 with respect to the display screen, and the proper magnification would be determined by the controller for display as indicated above. This magnification may be achieved by digitally zooming the image or physically zooming the lens of the camera. Other real-world real time applications are in medicine in non-invasive surgery and endoscopies, and in remote control surgery wherein the flat-panel display shows a view looking into the patient's body, and in transportation in tractor trailer trucks, coaches or buses wherein the flat-panel display shows a view looking from the rear of the vehicle.

The virtual window display system of the present invention may further be used in advertising applications to permit advertisements to follow the viewer as he walks past. Additionally, the advertising application could lock in on a viewer, for example selecting the person that is determined to be looking at the screen, or it could freeze the image if a second person looks at the screen. These factors may be varied to minimize the distraction to other people in the room. Additionally, reverse application of the virtual window of the present invention could be used in poster advertisements to stimulate a passerby's peripheral vision. For example, when a person turns his head to look, the image freezes, and as soon as the person looks away the ad begins to move again.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of simulating to one or more individual observers a view through a window using a display screen comprising:
    providing a storage device containing in electronic form one or more stored images of a scene at one or more different angles or at one or more different magnifications;
    providing a display screen for displaying the one or more images to one or more individual observers;
    determining location of one or more individual observers with respect to the display screen;
    using a computer, selecting one or more of the stored images based on angle or distance of the one or more individual observers with respect to the display screen, the selected one or more stored images not being in real time at the time of selection; and
    using a computer, displaying the selected one or more stored, non-real time images on the display screen to simulate to the one or more individual observers a view through a window of the scene.

2. The method of claim 1 further including changing the displayed image on the display screen based on changing location of one or more individual observers with respect to the display screen.

3. The method of claim 1 wherein the location of the one or more individual observers with respect to the display screen comprises distance of the one or more individual observers from the display screen, and wherein the one or more images selected is based on the distance of the one or more individual observers from the display screen.

4. The method of claim 1 wherein the location of the one or more individual observers with respect to the display screen comprises angle of the one or more individual observers with respect to the display screen, and wherein the one or more images selected is based on the angle of the one or more individual observers with respect to the display screen.

5. The method of claim 1 wherein the location of the one or more individual observers with respect to the display screen comprises distance of the one or more individual observers from the display screen and angle of the one or more individual observers with respect to the display screen, and wherein the one or more images selected is based on the distance of the one or more individual observers from the display screen and the angle of the one or more individual observers with respect to the display screen.

6. The method of claim 1 wherein the one or more images of the scene are provided by providing a camera at a scene location, and capturing a plurality of images of the scene while the camera rotates over a desired angle through a desired plane.

7. The method of claim 6 further including storing the one or more images of the scene in the storage device, and wherein the storage device is associated with the display screen.

8. The method of claim 1 wherein the one or more images displayed on the display screen are still images, and wherein the display screen sequentially displays still images that differ in angle of view and magnification of the scene based on changes in location of the one or more individual observers with respect to the display screen.

9. The method of claim 1 wherein location of one or more individual observers with respect to the display screen is determined using a pressure, ultrasonic, infrared or radar sensor, or a camera.

10. The method of claim 1 wherein the display screen is planar, and the location of the one or more individual observers with respect to the display screen is based on distance of the one or more individual observers from a center of the display screen, and by angle of a line extending between the center of the display screen and the one or more individual observers.

11. The method of claim 1 wherein the image of the scene is digitally magnified based on distance of the one or more individual observers from the display screen.

12. A system for simulating to one or more individual observers a view through a window using a display screen comprising:
   a storage device containing in electronic form one or more stored images of a scene at different angles or at different magnifications;
   a display screen adapted to display the one or more images to one or more individual observers;
   a sensor adapted to locate one or more individual observers with respect to the display screen; and
   a controller adapted to select one or more of the stored images based on angle or distance of the one or more individual observers with respect to the display screen, the selected one or more stored images not being in real time at the time of selection, and display the selected one or more stored, non-real time images on the display screen to simulate to the one or more individual observers a view through a window of the scene.

13. The system of claim 12 wherein the controller is adapted to change the displayed image on the display screen based on changing location of one or more individual observers with respect to the display screen.

14. The system of claim 12 wherein the sensor is adapted to locate the one or more individual observers with respect to the display screen based on distance of the one or more individual observers from the display screen, and wherein the controller is adapted to select the one or more images based on the distance of the one or more individual observers from the display screen.

15. The system of claim 12 wherein the sensor is adapted to locate the one or more individual observers with respect to the display screen based on angle of the one or more individual observers with respect to the display screen, and wherein the controller is adapted to select the one or more images selected based on the angle of the one or more individual observers with respect to the display screen.

16. The system of claim 12 wherein the sensor is adapted to locate the one or more individual observers with respect to the display screen based on distance of the one or more individual observers from the display screen and angle of the one or more individual observers with respect to the display screen, and wherein the controller is adapted to select the one or more images based on the distance of the one or more individual observers from the display screen and the angle of the one or more individual observers with respect to the display screen.

17. The system of claim 12 further including a camera at a scene location adapted to capture a plurality of images of the scene while the camera rotates over a desired angle through a desired plane.

18. The system of claim 17 wherein the camera is adapted to store the images of the scene in the storage device, and wherein the storage device is associated with the display screen.

19. The system of claim 12 wherein the location sensor is a pressure, ultrasonic, infrared or radar sensor, or a camera.

20. The system of claim 12 wherein the display screen is planar, and the location sensor is adapted to determine location of the one or more individual observers with respect to the display screen based on distance of the one or more individual observers from a center of the display screen, and by angle of a line extending between the center of the display screen and the one or more individual observers.

21. The system of claim 12 wherein the controller adapted to digitally magnify the image of the scene based on distance of the one or more individual observers from the display screen.

22. A computer program product for use with a display device for simulating to one or more individual observers a view through a window, said computer program product comprising:
   a non-transitory computer usable medium having computer readable program code means embodied in said medium for providing one or more electronically stored images of a scene at different angles or at different magnifications;
   computer readable program code means for determining location of one or more individual observers with respect to the display device;
   computer readable program code means for selecting one or more of the stored images based on angle or distance of the one or more individual observers with respect to the display device, the selected one or more stored images not being in real time at the time of selection; and
   computer readable program code means for displaying the selected one or more stored, non-real time images on the display device to simulate to the one or more individual observers a view through a window of the scene.

* * * * *